Aug. 28, 1956    T. E. PIAZZE    2,760,320
TRANSFER MECHANISM
Original Filed March 12, 1949
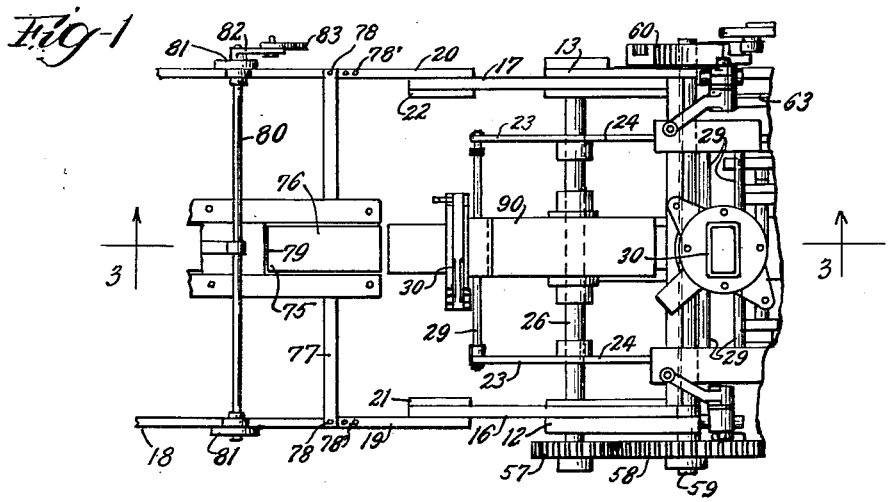
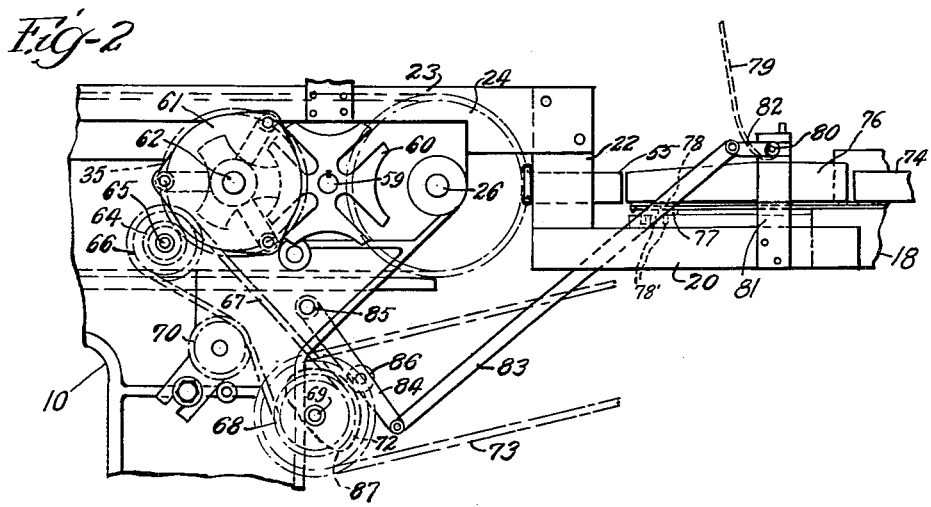
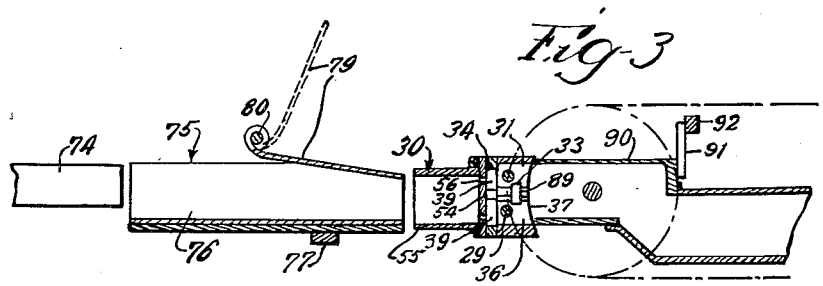
INVENTOR.
Thomas E. Piazze
BY
Cromwell, Greist & Warden
Attys.

United States Patent Office 2,760,320
Patented Aug. 28, 1956

2,760,320

TRANSFER MECHANISM

Thomas E. Piazze, Mount Vernon, Ohio, assignor, by mesne assignments, to Continental Can Company, Inc., New York, N. Y., a corporation of New York Original application March 12, 1949, Serial No. 81,154, now Patent 2,676,443, dated April 27, 1954. Divided and this application May 25, 1953, Serial No. 357,151

6 Claims. (Cl. 53—183)

This invention is concerned with improvements in a mechanism for automatically transferring a container or bag formed of pliable sheet material from a container forming machine to a machine for filling the container with a commodity and closing and sealing the same.

This application is a division of application, Serial No. 81,154, filed March 12, 1949, for a Container Filling, Closing and Sealing Machine, now Patent Number 2,676,-443, granted April 27, 1954.

It is an object of the invention to provide a transfer mechanism for successively removing open ended tubular merchandise containers from a container making machine and for depositing the same in the pockets of an endless conveyor on a filling and closing machine which is arranged at the discharge end of the container making machine.

These and other objects of the invention will be apparent from a consideration of the mechanism which is shown by way of illustration in the accompanying drawings, wherein:

Fig. 1 is a plan view of a mechanism embodying the principles of the invention, with portions only of the associated container making machine and container filling and closing machine being shown;

Fig. 2 is a side elevation of the mechanism, and

Fig. 3 is a longitudinal section taken on the line 3—3 of Fig. 1.

Referring to the drawings there is illustrated a mechanism for transferring to a container filling and closing machine, containers formed on a container fabricating machine of the type in which a series of mandrels are carried on an endless conveyor and sheets of container making material are folded over the ends of the mandrels to form flat bottom containers having vertical side seams. After a sheet of material is folded over a mandrel and the seams are sealed the container is adapted to be removed from the mandrel in the horizontal direction, generally with the widest side of the container extending crosswise of the machine.

The transfer mechanism is so constructed that the containers are successively stripped from the mandrels of the fabricating machine and transferred to mandrels or pockets on a conveyor for the filling and closing machine, which conveyor is arranged to advance the empty containers to mechanism where each container is filled, closed and sealed. The filling and closing machine is provided with appropriate drive mechanism for direct connection with the drive mechanism of the container fabricating machine or it is operated by independent drive mechanism with appropriate means for synchronizing the movement of the container receiving conveyor thereof with the movement of the mandrel carrying conveyor of the container fabricating machine.

The filling and closing mechanisms are supported on a generally rectangular frame 10 which comprises a base having upstanding front and rear side frame members 12 and 13 which are laterally spaced at the receiving end of the machine, and top front and rear side plates 16 and 17 which extend longitudinally of the machine and connect the upstanding side frame members 12 and 13 with similar side frame members at the discharge end of the machine. The top side plates 16 and 17 are connected at their ends to side frame members of the container fabricating machine 18 by horizontal connecting plates 19 and 20 which extend between the side frame members of the container machine and the plates 21 and 22 depending from the ends of the frame members 16 and 17.

The conveyor for the filling and closing machine comprises a pair of transversely spaced endless chains 23 which are carried on spaced pairs of sprockets at the ends of the machine, the sprockets 24 at the receiving end of the machine being shown. The sprockets 24 are secured to the driven shaft 26 which is journaled in the side frame members 12 and 13. The endless chains 23 are connected at longitudinally spaced intervals by transversely extending pairs of rods 29 which support intermediate their ends a series of hollow mandrels 30 for receiving and carrying the containers.

Each mandrel 30 comprises a base 31 secured on the supporting rods 29 and having a circular plate 34 rotatably secured to its outer face by a pivot pin 33. The base 31 and the plate 34 are each provided with relatively large apertures 36 and 39 which are aligned in the position shown in Fig. 3, during the transfer of the containers. The bottom or inner face of the base 31 is curved at 37 in the direction transversely of the same. A cover plate 54 is secured on the outer or upper face of the plate 34 and carries outwardly projecting pocket forming members 55. The members 55 form a hollow tube section for receiving the container or bag, and the cover plate 54 is perforated or provided with apertures 56 within the hollow tube section which communicate with apertures 39 and 36 so that in the two positions which the plate 34 is adapted to occupy there is a communicating passageway between the bottom of the bag supporting members 55 and the curved bottom 37 of the base member 31.

The chains 23 on which the mandrels 30 are mounted are intermittently moved by operation of the shaft 26 which carries the sprockets 24 at the receiving end of the machine. The shaft 26 is provided with a gear 57 adjacent the front side of the frame member 12 which meshes with the gear 58 on the transverse shaft 59. The shaft 59 is journaled in the frame members 12 and 13 and is provided on its other end with a Geneva mechanism comprising a driven element 60 and the continuously operating driving element 61 provided on the shaft 62.

The shaft 62 is provided with a gear 63 on the inside of the frame 13 which meshes with the pinion 64 on the shaft 65 which is journaled in the side frame members 12 and 13. Shaft 65 is provided with a sprocket 66, on the outside of the frame member 13, which is connected by a chain 67 to the drive sprocket 68 on the stub shaft 69. An idler sprocket 70 is supported on a bracket 71 which is adjustably mounted on a side frame 13 and provides tension in the chain 67.

The stub shaft 69 is journaled on the side frame member 13 and carries a sprocket 72 which is connected by a drive chain 73 to the power drive shaft of the container fabricating machine 18 and which supplies driving power for operating the filling and closing mechanism in timed relation to the movement of the mandrels 74 on the container fabricating machine 18.

The mandrels 30 are adapted to be operated in such a manner that they will be brought successively to a point or station at the receiving end of the machine where the pocket forming members 55 extend outwardly in alignment with a transverse chute 75. The chute 75 is horizontally positioned somewhat lower than the mandrel 74 on the container machine 18 when the latter is in position for removal of the container. The chute 75 provides a passageway for the containers as they are stripped successively from the mandrels 74 and transferred to the pocket forming members 55.

The chute 75 comprises a three sided or channel-shaped member 76 supported on the cross bar 77 which is adjustably mounted at its ends on the side connecting plates 19 and 20 by bolts 78 and spaced bolt holes 78'. The chute 75 is provided with a movable side 79 which is secured to a pivoted cross bar 80. The cross bar 80 is journaled in the upstanding side plates 81 which are connected at their base to the side connecting plates 19 and 20. An arm 82 is secured on one end of the cross bar 80 and pivotally connected to the upper end of a link 83, the lower end of which is pivotally connected to an operating arm 84. The arm 84 is pivotally secured to the frame member 13 at 85 and provided with cam roller 86 engaging the cam 87 mounted on the stub shaft 69 adjacent the driving sprocket 72.

When the container receiving mandrel 30 is positioned at the container receiving station in line with the transverse chute 75 the curved bottom surface 37 of the mandrel base 31 engages with the curved open end 89 of the forward portion 90 of a vacuum tunnel which is supported by a bracket 91 depending from the cross rail 92 which extends between the frame members 12 and 13. The vacuum tunnel extends toward the center of the machine and is connected with a suction pump (not shown) which may be motor driven or operated in any other conventional manner to provide suction in the tunnel 90 sufficient to pull the container through the transverse chute 75 into the receiving pocket 55 on the mandrel 30.

The container carrying mandrel 30 is thereafter moved from the container receiving station to a filling station to receive the material being packaged.

In operation the container fabricating machine 18 intermittently forms the containers around the mandrels 74 and successively presents the mandrels in horizontal alignment with one end of the transverse chute 75. The filling and closing machine operates intermittently in timed relation to the operation of the fabricating machine 18, through the connecting drive mechanism, to present successive pocket formations 55 on the mandrels 30 in horizontal alignment with the other end of the transverse chute 75. The containers as they are formed are successively transferred through the chute 75 to the pocket 55 by suction in the vacuum line 90. The chute wall 79 is swung upwardly to provide clearance for the mandrel 30 as it moves upwardly away from the chute 75 after the container is transferred. The pocket formations 55 are pivoted so that they may be rotated relative to the base 31 to properly position the same for receiving the container and to permit subsequent rotation of the container for the filling and closing operations.

I claim:

1. In a container fabricating and filling arrangement wherein a flat bottom container is fabricated on a machine having a movable forming mandrel and then transferred to a machine having a pocketed conveyor for receiving a charge of material, a container transfer mechanism comprising a chute mounted between the machines in aligned relation between said forming mandrel and a pocket in said pocketed conveyor when said mandrel and said conveyor are in a predetermined position substantially at rest, means for moving successive containers from said forming mandrel and through the chute into successive pockets in said pocketed conveyor, said chute having a swingable wall and means for moving said wall away from said chute in timed relation to the movement of said pocketed conveyor.

2. Mechanism for transferring successive containers from a container fabricating machine having a series of forming mandrels mounted in spaced relation on an intermittently operated conveyor and cooperating means for folding sheet material around successive mandrels to form thereon flat bottom containers, to a container filling and closing machine which is arranged in longitudinal alignment with said fabricating machine and which has an intermittently operated conveyor and a series of pocketed mandrels mounted in spaced relation thereon, said mechanism comprising a horizontal chute extending between said machines and providing a container guideway between said mandrels, said chute having a pivoted upper side, means for operating said machines whereby to align said forming mandrels with successive pocketed mandrels at a transfer station between adjacent ends of the machines, means connected to said operating means for pivoting said side in timed relation to the movement of said conveyors, and vacuum means at said transfer station, which vacuum means is connected to successive pocketed mandrels when they are in alignment with the forming mandrels at the transfer station for moving the containers from said forming mandrels through said chute and into said pocketed mandrels.

3. In a container fabricating and filling mechanism wherein a flat bottom container is fabricated on a movable forming mandrel and then transferred to a supporting mandrel on a movable conveyor having a filling mechanism associated therewith, a container transfer mechanism comprising a chute mounted at a transfer station at which successive forming and supporting mandrels are brought into aligned relation, means for moving the container from the forming mandrel and through the chute into a supporting mandrel on said movable conveyor, means forming a passageway connected with the bottom of said supporting mandrels when said supporting mandrels are in a predetermined position relative to said transfer station, and vacuum means for applying suction in said passageway.

4. A container transfer mechanism comprising a transfer chute positioned between a container fabricating mechanism and a container filling mechanism, the container fabricating mechanism being adapted to form successive flat bottom containers in opened up condition and to position the same with the bottom at one end of said transfer chute, the container filling machine having a series of pocket forming open top receptacle members mounted on an intermittently operated endless conveyor which is positioned with one end adjacent said transfer chute to bring the open tops of successive receptacles into alignment with the other end of said transfer chute to receive successive containers therein, said transfer chute having a pivoted side wall portion, and means for pivoting said side wall portion in timed relation to the movement of said conveyor to provide an opening in the side wall for passage of the top portion of the container when the container is delivered through the transfer chute and the bottom portion thereof is seated in a pocket forming receptacle.

5. A container transfer mechanism comprising a transfer chute positioned between a container fabricating mechanism and a container filling mechanism, the container fabricating mechanism having an intermittently operated endless conveyor and associated mechanism for forming thereon successive flat bottom containers in opened up condition and one end of said conveyor being adjacent said transfer chute to position each successive container with the bottom at one end of said transfer chute, the container filling machine having a series of pocket forming open top receptacle members mounted on an intermittently operated endless conveyor which is arranged with one end adjacent said transfer chute to bring the open tops of successive receptacles into alignment with the other end of the transfer chute to receive the bottom portions of successive containers therein, said transfer chute having a movable side wall portion, and means for moving said side wall portion in timed relation to the movement of said conveyors to provide an opening in the side wall for passage of the top portion of each container as it is delivered through the transfer chute and the bottom portion thereof is received in a pocket forming receptacle.

6. A container transfer mechanism comprising a transfer chute positioned horizontally between a container fabricating mechanism and a container filling mechanism, the container fabricating mechanism having a horizontal endless conveyor and associated mechanism for forming thereon successive flat bottom containers in opened up condition and for positioning the same with the bottom thereof at one end of said transfer chute, the container filling machine having a series of open top receptacle members mounted on a horizontal conveyor which is arranged with one end adjacent said transfer chute to bring the open tops of successive receptacles into alignment with the other end of said transfer chute to receive successive containers therein, said transfer chute having a pivoted upper side wall portion, and means for pivoting said side wall portion upwardly in timed relation to the movement of said conveyors to provide an opening in the side wall for passage of the top portions of the containers as the containers are delivered through the transfer chute and into the open top receptacles.

References Cited in the file of this patent

UNITED STATES PATENTS

| | | |
|---|---|---|
| 1,379,254 | Ekstrom | May 24, 1921 |
| 1,851,870 | Rose | Mar. 29, 1932 |
| 2,427,712 | Casler | Sept. 23, 1947 |